United States Patent

[11] 3,619,245

[72] Inventor Hiroshi Maekawa
Sakai-shi, Japan

[21] Appl. No. 743,283
[22] Filed July 9, 1968
[45] Patented Nov. 9, 1971

[73] Assignee Okuno Chemical Industry Company, Limited
Osaka-shi, Japan

[32] Priority July 13, 1967
[33] Japan
[31] 42/45448

[54] PRELIMINARY TREATMENT FOR POLYOLEFINS TO BE CHEMICALLY METAL PLATED
9 Claims, No Drawings

[52] U.S. Cl. .................................................. 117/47 A, 117/160, 156/2, 156/3, 204/30
[51] Int. Cl. .................................................. B44d 1/092, C23c 3/02
[50] Field of Search .................................................. 117/47 R, 160; 156/2, 3; 204/30

[56] References Cited

UNITED STATES PATENTS

| | | | |
|---|---|---|---|
| 2,878,519 | 3/1959 | Wolinski .................... | 117/47 R X |
| 3,437,507 | 4/1969 | Jensen .................... | 117/47 R |

*Primary Examiner*—Alfred L. Leavitt
*Assistant Examiner*—Janyce A. Bell
*Attorney*—Stephens, Huettig & O'Connell

ABSTRACT: In chemically plating a polyolefin resin, a process which comprises wetting a surface of a polyolefin resin to be etched for chemical plating with an organic solvent solution of an organic peroxide having a concentration of 10 to 90 weight percent, and then decomposing the organic peroxide on the surface of the polyolefin resin.

PRELIMINARY TREATMENT FOR POLYOLEFINS TO BE CHEMICALLY METAL PLATED

This invention relates to a preliminary treatment for polyolefins to be chemically plated, and more particularly to a process for turning a polyolefin resin surface into so active a state as to be easily etched with an etching agent applied in preparation for chemical plating with copper or nickel.

There have been proposed numerous methods for depositing metal coatings on plastic surfaces by chemical reduction. In general, the formation of conductive metallic film on a plastic surface involves etching, sensitizing, activating and chemical plating steps. The etching step is very important and governs the success or failure of the production of a continuous metallic film on a plastic surface by the final chemical plating step. This etching operation is usually performed by dipping a plastic to be chemically plated in a sulfuric acid - potassium dichromate mixture or a sulfuric acid - potassium permanganate mixture. By this treatment the plastic is etched microscopically and turned wettable with water. The above etching procedure is effective for various plastics, particularly for acrylonitrile—butadiene—styrene copolymer, but ineffective for polyolefins because of their highly resistant property to chemicals. In fact, when polyolefins, such as polypropylene and polyethylene, are directly treated with the conventional etching agent, they can not be etched sufficiently and evenly, thus making it impossible to produce an even and strongly adherent metallic film on the propylene resin surface by the final chemical plating.

As far as the inventor is aware there has been proposed no successful method for plating polyolefins, though various attempts have been made for the purpose.

A main object of the invention is accordingly to provide a method for successful chemical plating of polyolefin resins.

Another object of the invention is to provide a preliminary treatment for polyolefins resins to be chemically plated, whereby the polyolefin resins inert to chemicals are turned so active as to be chemically etched effectively, thus making it possible to produce a continuous and strongly adherent metallic film on the surface thereof.

The above and other objects of the invention which will be apparent from the following descriptions can be attained by wetting a surface of a polyolefin resin to be etched for chemical plating with an organic solvent solution of an organic peroxide having a concentration of 10 to 90 weight percent, and then decomposing the organic peroxide on the surface of the polyolefin resin.

According to the research of the present inventor, it has now been found that when a surface of a polyolefin resin is wetted with an organic solvent solution of an organic peroxide, and the peroxide is then decomposed on the surface thereof, the surface thus treated is turned so active by the nascent oxygen generated from the peroxide as to be effectively etched by a subsequent etching step and further effectively sensitized, activated and chemically plated in the conventional methods to produce a suitably conductive and adherent metallic film thereon. decomposed.

In the invention various kinds of organic peroxides can be used, as the organic peroxides have a property to generate nascent oxygen when decomposed. The typical organic peroxides used in the invention are exemplified as follows:

1 . Alkyl or aryl peroxides:

$$R^1-0-0-R^2$$

2. Hydroxy alkyl or hydroxy aryl peroxides:

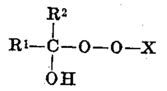

3. Diacyl peroxides $$(R3\ CO)_2\,{}^0{}_2$$

4. Peroxyacids or esters thereof:

$R^3$C OOO $R^2$ wherein $R^1$ is a monovalent organic group, $R^2$ is hydrogen or a monovalent organic group, X is hydrogen or

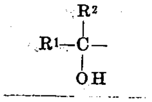

, $R^1$ and $R^2$ being the same as above, and $R^3$ CO— is an acyl group.

The monovalent organic groups expressed by $R^1$ and $R^2$ include: (a) alkyl groups, such as methyl, ethyl, propyl, butyl, pentyl, hexyl, heptyl, octyl, etc.; (b) cycloalkyl groups, such as cyclopropyl, cyclobutyl, cyclohexyl, etc.; (c) alkyl-cycloalkyl groups, such as methylcyclobutyl, ethylcyclopentyl, etc.; (d) cycloalkyl-alkyl groups, such as cyclopropylmethyl, cyclopentylethyl, etc.; (e) aryl groups, such as phenyl, biphenyl, naphthyl, etc.; (f) aralkyl groups such as benzyl, phenylethyl, naphthylpropyl, etc.; and (g) alkyl-aryl groups, such as cumyl, etc. The acyl groups represented by $R^3$ CO-include acetyl, propionyl, butyroyl, diisopropionyl, diethylhexanoyl, trimethyl hexanoyl, lauroyl, decanoyl, stearoyl, succinoyl, benzoyl, monochlorobezoyl, dichlorobenzoyl, phthaloyl, etc. Preferred examples of the peroxides are: (1 ) tertbutylhydroperoxide, cumylhydro-peroxide, diisopropylbenzene peroxide, paramenthanehydro peroxide, 2,5 -dimethylhexane-2,5 -dihydro-peroxide, ditertiary-butyl peroxide, dicumyl peroxide tert-butylcumyl peroxide, 2,5 -dimethyl-2,5 -di(tert-butylperoxy) hexane, αα'-bis (tert-butylperoxy)-p-isopropylbenzene and the like alkyl or aryl peroxides; (2 ) methylethyl ketone peroxide, cyclohexanone peroxide, methylisobutyl ketone peroxide, methylamyl ketone peroxide, 1,1 -bis (tert-butylperoxy)-cyclohexane and the like hydroxy alkyl or hydroxy aryl peroxides,; (3) (3) acetyl peroxide, propionyl peroxide, isobutyroyl peroxide, 3,5,5-trimethylhexanoyl peroxide, octanoyl peroxide, lauroyl peroxide, decanoyl peroxide, stearoyl peroxide, benzoyl peroxide, 2,4 dichlorobenzoyl peroxide, p-chlorobenzoyl peroxide, succinic acid peroxide, diisopropyl peroxydicarbonate, di-2 -ethylhexyl peroxydicarbonate and the like diacyl peroxides; and (4 ) peroxyacetic acid, peroxybutyric acid, peroxybenzoic acid, peroxycinnamic acid, monoperoxysuccinic acid, monoperoxyphthalic acid, diperoxytelephthalic acid, tert-butyl-hydroperoxyacetate, tert-butyl-peroxyisobutylate, tert-butylperoxypivalate, tert-butylperoxy-2-ethyl hexanoate, tert-butyl-peroxylaurate, tert-butyl-peroxybenzoate, di-tert-butyl-diperoxyphthalate, 2,5 -dimethyl- 2,5 -di(benzoyl-peroxy) hexane, tert-butylperoxy-maleic anhydride, tert-butylperoxyisopropyl-carbonate and the like peroxy acids and esters thereof. Of these organic peroxides alkyl or aryl peroxides, particularly alkylhydro- or arylhydro-peroxides, are desirable in the invention, most desirable being cumylhydro-peroxide, diisopropylbenzenehydro-peroxide and p-menthanehydroperoxide.

In the invention the organic peroxides may be used in a form of an organic solvent solution. The concentration of the solution varies over a wide range in accordance with the kinds of the peroxides, solvents and other factors, but 10–90 weight percent is desirable, most desirable being 20–60 weight percent. As the solvents there may be used those having wettability to polyolefin resins as well as solubility to the organic peroxides, such as methyl alcohol, ethyl alcohol, isopropyl alcohol, acetone, methylethyl ketone, n-heptane, benzene, xylene, toluene, cumene, methyl acetate, dimethyl phthalate, etc. Such organic solvent solution of the peroxide may be diluted with water as far as the solution does not lose its stability. To improve the wettability of the solution to the polyolefin resins as required, surface active agents may be added.

The polyolefin resins to be treated in accordance with the process of the invention include solid polymers of olefins, such as ethylene homopolymers, propylene homopolymers, butylene homopolymers, ethylene-propylene copolymers, etc. but the present process is particularly profitable for propylene homopolymers. The polymers may be used in the form of various plastic mouldings such as the parts of television sets, radio sets, vacuum cleaners, refrigerators, automobiles, office machines and other appliances, decorations, trinkets, and the like.

According to the process of the invention the surfaces of the polyolefin resins to be chemically plated are wetted with the peroxide solutions by the conventional means, such as dipping, brushing, spraying, etc. The peroxides applied to the resin surfaces are decomposed by the methods known in the art. Although a suitable decomposition method may be determined in accordance with the kinds of the peroxides used, shapes of the polyolefin resin mouldings and other factors, it is generally desirable that the peroxide is decomposed by bringing it into contact with an inorganic acid. In this case the polyolefin resin mouldings wetted with the peroxide solution may be dipped in an acid bath, such as sulfuric acid of a concentration of 10 to 100 weight percent, preferably 50 to 80 weight percent, at a temperature of 10° to 150° C., preferably 50° to 90° C., to decompose the peroxide attached to the resin surfaces. Usually 15 second to 60 minute dipping is sufficient for the purpose. To the acid bath there may be added a salt of cobalt (II) or iron (II), thereby producing the surface which can be more effectively etched with the conventional etching agent for chemical copper or nickel plating. These salts are, for example, cobalt acetate, cobalt chloride, ferrous chloride, ferrous sulfate, etc., and are usually added to the acid bath in the range of 1 to 200 grams, preferably 5.0 to 20 grams, based on one liter of the acid bath. Surface active agents resistant to the acid may be added to the acid bath, as required. The resin mouldings wetted with the peroxide solution may also be heated at a temperature between a decomposing temperature of the peroxide and a softening temperature of the resin, or exposed to ultraviolet light to decompose the peroxide attached to the resin surface. The former treatment is usually conducted in an air oven or in a liquid bath, such as sodium hydroxide solution, sodium chloride solution and the like alkali or salt bath, and usually 1 to 10 minute treatment is sufficient for the purpose. The latter treatment is generally performed in normal atmosphere at a temperature of 10° to 80° C. for about 10 seconds to 60 minutes.

By the decomposition of the peroxide nascent oxygen is generated on the surface of the resin treated as above, thus turning the surface into an active state to etching agent which is used in the subsequent treatment, so that when the surface thus treated is chemically etched by the conventional method there is obtainable evenly and microscopically etched surface which can receive metal deposition effectively by the further chemical plating treatments. In fact, when the polyolefin resin treated by the process of the invention is subsequently etched, sensitized, activated and finally chemically plated in the conventional methods, there can be produced a metal layer on the resin surface, which is even, continuous, suitably conductive and strongly adherent to the surface.

The subsequent etching, sensitizing, activating and chemically plating steps are known in the art, and every known method is applicable in the invention. The basic technics for such treatments are described in various literatures, such as, for example "Metallizing of Plastics" by Harold Narcus, pages 14 to 34 (1960).

For better understanding of the invention preferred operations for such subsequent steps are illustrated hereinafter. As such operations are of secondary significance in the invention, it goes without saying that the invention is not limited by the following descriptions.

In the etching process, the polyolefin resin treated with the organic peroxide in accordance with the process of the invention and rinsed with water is dipped in an acidic etching solution such as a sulfuric acid—potassium dichromate mixture or sulfuric acid—potassium permanganate mixture at about 20°to 90° C. for about 5 to 60 minutes. The most desirable dichromate mixture of the following formulations:

| | |
|---|---|
| Conc. sulfuric acid | 300–1800 g./liter |
| Potassium dichromate | 5– 50 g./liter |
| Water | Amount necessary for making one liter solution. |

To the etching bath there may be added phosphoric acid as required.

The etched polyolefin resin is then rinsed with water and dipped in a sensitizing agent at 10°–50° C. for about 1–60 minutes. The desirable sensitizing agent comprises dilute acidic solution containing a water-soluble inorganic tin (II) salt such as stannous chloride or stannous sulfate dissolved in an inorganic acid such as hydrochloric acid or sulfuric acid. The preferred formulations of such sensitizing agents are as follows:

A)

| | |
|---|---|
| Stannous chloride | 2–100 g./liter |
| 35% hydrochloric acid | 2–100 g./liter |
| Water | Amount necessary for making one liter solution |

B)

| | |
|---|---|
| Stannous sulfate | 10–50 g./liter |
| Conc. sulfuric acid | 5–30 g./liter |
| Water | Amount necessary for making one liter solution |

After rinsing with water the polyolefin resin thus sensitized is then dipped in an activating agent at about 10°–70° C. for about 1–20 minutes. The activating agent comprises dilute acidic solution containing a water soluble inorganic salt of a catalytic metal such as gold, silver, palladium, platinum, etc. The most desirable catalytic compounds are palladium salts such as palladium chloride and palladium sulfate, and preferable formulations are as follows:

| | |
|---|---|
| Palladium chloride | 0.05–0.5 g./liter |
| 35% hydrochloric acid | 0.5–5.0 g./liter |
| Water | Amount necessary for making one liter solution |

It is possible to carry out the sensitizing step and activating step at the same time in a single bath by using an acidic bath composition containing catalytic metal ion and stannous ion. Such process is disclosed in detail in Japanese Patent Publication No. 4161/1963. Moreover, the etching, sensitizing and activating steps can be carried out simultaneously in a single bath which contains palladium chloride dissolved in at least one of sulfuric acid, phosphoric acid and chromic acid. This process is disclosed in detail in Japanese Patent Publication No. 24965/1967, which was invented by Hiroshi Maekawa et al., inventor of the present invention.

Following these treatments, i.e., preliminary treatment with organic peroxide, etching, sensitizing and activating, the polyolefin resin is now ready to receive the copper or nickel film. This metal film is produced by dipping the polyolefin resin thus activated and finally rinsed with water in a chemical copper or chemical nickel bath in the conventional manners for chemical plating. The chemical copper or nickel baths are conventional and contain a water soluble inorganic salt of copper (II) or nickel (II), complexing agent, reducing agent and alkaline or acidic substance. In the plating method, the resin is dipped in the bath at 10°–95° C. preferably at 15°–65° C. for 1–20 minutes, thus producing a suitably conductive and strongly adhered copper or nickel film on the polyolefin resin surface.

The chemically metal-plated resins are electroplated in the conventional manner to the desired thickness, as required, to produce a metal film having smooth and beautiful surface.

For fuller understanding of the invention examples will be given below wherein all percentages show weight percent and the peeling test and the heating and cooling test were carried out under the following conditions in accordance with the methods described in "Product Finishing" Vol 18, No. 5 pages 66 to 72(1965)

Reeling Test.

Over the entire length of electroplated surface of the sample two parallel lines 1 cm. apart were cut so deep as to reach the surface of the plastics and the cut electroplated layer was stripped from one end to the other by pulling it at an angle of 90°at the rate of 3 cm./min. (1965) the cut lines and the force (kg./cm.) required for stripping was sought.

Heating and Cooling Test:

10 electroplated samples were heated at 120° C. for 1 hour, then left at 20° C for 30 min. and cooled at −10° C for one hour. The samples were subjected to 6 cycles of the above treatment, and the number of samples were sought whose plated layer had blistered. The samples which showed blisters of electroplated layer by 1 cycle of treatment were excluded in the subsequent cycles.

EXAMPLE 1

A 5 cm. ×10 cm. ×0.3 cm. plate of a propylene homopolymer having a melting point of about 170° C. was dipped in a 30 percent ethanol solution of cumyl hydroperoxide at room temperature (25° C.) for 30 seconds and taken out from the solution. The plate wetted with the peroxide solution was then dipped in 70 percent sulfuric acid at 70° C. for 5 minutes to decompose the cumyl hydroperoxide attached thereto and thoroughly rinsed with water Thus the lustrous surface of the plate turned cloudy, and it was observed by a microscope that minute and spherical hollows of 1–3 μdiameter were distributed evenly throughout the surface.

The resultant propylene resin plate was then dipped in the following etching solution at 75° C. for 20 minutes, and rinsed with water:

| | |
|---|---|
| 96% Sulfuric acid | 760 g./liter |
| 89% Phosphoric acid | 200 g./liter |
| Potassium dichromate | 25 g./liter |
| Water | Amount necessary for making one liter solution |

The plate was further dipped in the following solution for sensitizing at room temperature (25° C.) for 3 minutes and rinsed with water:

| | |
|---|---|
| Stannous chloride | 15 g./liter |
| 35% Hydrochloric acid | 10 g./liter |
| Water | Amount necessary for making one liter solution |

Thus sensitized plate was further dipped in the following solution for activating at room temperature (25° C.) for one minute and rinsed with water:

| | |
|---|---|
| Palladium chloride | 0.3 g./liter |
| 35% Hydrochloric acid | 7 g./liter |
| Water | Amount necessary for making one liter solution |

Then the plate was dipped in the following chemical nickel bath of pH 9.5 at 60° C. for 5 minutes:

| | |
|---|---|
| Nickel sulfate | 30 g./liter |
| Sodium hydro phosphite | 10 g./liter |
| Ammonium chloride | 50 g./liter |
| Water | Amount necessary for making one liter solution |

Thus even and continuous nickel film having no blister was formed on the plate

The resultant plate was electroplated in the following bath under cathode current density of 3 A./dm² at 25° C for 35 minutes to produce electroplated copper layer of 20μ thickness.

| | |
|---|---|
| Cupric sulfate | 200 g./liter |
| 96% Sulfuric acid | 50 g./liter |
| UBAC (Trade Mark, acid brightening agent used in copper plating) | 3 ml./liter |
| Water | Amount necessary for making one liter solution |

The plate was further dipped in the following bath of pH 4.0 under cathode current density of 3 A./dm² at 50° C. for 12 minutes to produce electroplated nickel layer of 7 μ thickness:

| | |
|---|---|
| Nickel sulfate | 240 g./liter |
| Nickel chloride | 45 g./liter |
| Boric acid | 30 g./liter |
| Burynediol | 0.01 g./liter |
| Sodium 1,3,6 -naphthalene trisulfonate | 1 g./liter |
| Water | Amount necessary for making one liter solution |

The nickel plated plate was finally dipped in the following bath under 20 A./dm² at 45° C. for one minute to produce chromium layer of 0.25 μ thickness.

| | |
|---|---|
| Chromic acid anhydride | 250 g./liter |
| Sulfuric acid | 2.5 g./liter |
| $Cr^{+++}$ | 3 g./liter |
| Water | Amount necessary for making one liter solution |

The product finished as above had an electroplated layer with smooth surface and beautiful metallic luster, exhibiting markedly high adhesion between the plated layer and the resin. By the peeling test it gave the minimum value of 8 kg./cm. and the maximum value of 9.5 kg./cm. and by the heating and cooling test no blisters were observed.

For comparison the same polypropylene resin plate was directly dipped in the same etching solution as above without being treated with any organic peroxide, and the plate was thereafter sensitized, activated, chemically plated and electroplated in the same manner as above.

The resultant plated metal layer was found blistered markedly and gave zero kg./cm. by the peeling test.

EXAMPLE 2

A 5 cm. ×10 cm. ×0.3 cm. plate of a propylene homopolymer having a melting point of about 162° C. was dipped in a 10 percent ethanol solution of benzoyl peroxide at room temperature (25° C.) for 10 seconds and taken out from the solution. The plate wetted with the peroxide solution was then heated in an air oven at 140° C. for 30 seconds to decompose the benzoyl peroxide attached thereto and thoroughly rinsed with water. Thus the lustrous surface of the plate turned cloudy, and it was observed by a microscope that spherical hollows of 1–3 μ diameter were distributed evenly throughout the surface.

The resultant polypropylene resin plate was then etched, sensitized and activated in the same manner as described in example 1.

The activated plate was dipped in the following chemical nickel plating bath of pH 5.8 at 70° C. for 5 minutes:

| | |
|---|---|
| Nickel sulfate | 25 g./liter |
| Sodium hypophosphate | 24 g./liter |
| Sodium succinate | 16 g./liter |
| Malic acid | 24 g./liter |
| Water | Amount necessary for making one liter solution |

Thus an even and continuous nickel layer was obtained. The resultant plate was further electroplated in the following bath under cathode current density of 3 A./dm² at 25° C for 45 minutes to produce electroplated copper film of 25μ thickness:

| | |
|---|---|
| Cupric sulfate | 200 g./liter |
| Sulfuric acid | 50 g./liter |
| UBAC (Trademark) | 3 ml./liter |
| Water | Amount necessary for making one liter solution |

The resultant metal layer had smooth surface and beautiful metallic luster. By the peeling test it gave the minimum value of 5.5 kg./cm. and the maximum value of 6.2 kg./cm.

EXAMPLE 3

A 5 cm. ×10 cm. ×0.3 cm plate of a propylene homopolymer having a melting point of about 165° C. was dipped in 10 percent aqueous solution of peracetic acid at room temperature (25°C.) for 10 seconds and taken out from the solution. The plate wetted with the peroxide solution was then heated in 50 percent aqueous solution of potassium hydroxide at 113° C. for 10 seconds. Thus the lustrous surface of the plate turned cloudy, and it was observed by a microscope that spherical hollows of 1–3 μ diameter were distributed evenly throughout the surface.

The resultant plate was then etched, sensitized and activated in the same manner as described in example 1.

The activated plate was dipped in the following chemical nickel plating bath of pH 12.5 at 40° C. for 5 minutes:

| | |
|---|---|
| Nickel sulfate | 20 g./liter |
| Sodium boron hydride | 2 g./liter |
| Rochell salt | 40 g./liter |
| Water | Amount necessary for making one liter solution |

The resultant chemical-plated nickel layer was even and continuous and exhibited strong adhesion to the plate.

EXAMPLE 4

A 5 cm. ×10 cm. ×0.3 cm. plate of a propylene homopolymer having a melting point of about 168° C. was dipped in 25 percent ethanol solution of tert-butylperisobutylate at room temperature (25° C.) for 0.5 minutes and taken out from the solution. One side of the plate wetted with the peroxide solution was exposed to ultraviolet light emitted from a 400–Watt mercury lamp situated 15 cm. apart from the plate at 50° C. for 10 minutes to decompose the perisobutylate adhered to the surface and the other side of the plate was not exposed to ultra violet light, and then the plate was rinsed with water. Thus the lustrous surface of the plate exposed to ultraviolet light turned cloudy, and it was observed by a microscope that spherical hollows of 1–3 μ diameter were distributed evenly throughout the surface.

The plate was then etched, sensitized, activated, chemically plated and electroplated in the same manner as described in example 1.

Marked differences were observed between the resultant metal layers produced in one side exposed to ultraviolet light and other side not exposed. The metal layer on the former side had smooth surface and no blisters, but the metal layer on the latter side had large blisters. By the peeling test the former gave the minimum value of 3.5 kg./cm. and the maximum value of 4.1 kg./cm. and the latter gave zero kg./cm.

EXAMPLE 5

The same propylene homopolymer plate as in example 1 was dipped in ethanol solution of the organic peroxide specified in table 1 below at room temperature 25° C.) for 30 seconds and taken out from the solution. The plate wetted with the peroxide solution was then dipped in 70 percent sulfuric acid under the conditions shown in the table 1 to decompose the peroxide attached to the plate surface and thoroughly rinsed with water.

The resultant plate was then etched, sensitized, activated, chemically plated and electroplated in the same manner as in example 1. The resultant metal layer has smooth surface and beautiful metallic luster. The results of the peeling test were shown in the table 1 below:

TABLE 1

| Peroxide used | Conc. of peroxide soln. (wt. %) | Conditions for decomposition | | Peeling Test (kg./cm.) | |
|---|---|---|---|---|---|
| | | Temp. (°C) | Dipping time (min.) | Min. | Max. |
| p-menthane hydroperoxide | 30 | 70 | 0.5 | 4.0 | 5.1 |
| diisopropyl-benzene hydroperoxide | 30 | 70 | 3 | 3.8 | 4.4 |
| 2,5-dimethyl-hexane-2,5-dihydro-peroxide | 20 | 70 | 5 | 3.1 | 3.9 |

EXAMPLE 6

A 5 cm. ×10 cm. ×0.3 cm. plate of ethylene homopolymer of a 7.0 melt index measured in accordance with ASTM 1238–57T was dipped in 30 percent ethanol solution of cumene hydroperoxide at room temperature (25° C.) for 30 seconds. The plate wetted with the peroxide solution was treated with the same manner as in example 1 to decompose the peroxide attached to the plate surface, and then etched, sensitized, activated, chemically plated and electroplated in the same manner as in example 1. The resultant plate thus obtained had an electroplated layer with smooth surface and beautiful metallic luster. By the peeling test it gave the minimum value of 4.2 kg./cm. and the maximum value of 5.1 kg./cm.

EXAMPLE 7

A 5 cm. ×10 cm. ×0.3 cm. plate of an ethylene-propylene copolymer containing 10 mole percent ethylene and having an average molecular weight of 260,000 was dipped in 30 percent ethanol solution of cumene hydroperoxide at room temperature (25° C.) for 30 seconds. The plate wetted with the peroxide was treated in the same manner as in example 1 to decompose the peroxide attached to the plate surface and rinsed with water. Thereafter the plate was etched, sensitized, activated, chemically plated and electroplated in the same manner as in example 1, thus producing a plated layer having smooth surface and beautiful metallic luster. By the peeling test it gave the minimum value of 2.5 kg./cm. and the maximum value of 3.4 kg./cm.

What we claim is:

1. In chemically plating a polyolefin resin, a process which comprises wetting a surface of a polyolefin resin to be etched for chemical plating with an organic solvent solution of an organic peroxide having a concentration of 10 to 90 weight percent, decomposing the organic peroxide on the surface of the polyolefin resin, etching the treated surface, sensitizing the etched surface with stannous salt, activating the sensitized surface with noble metal salt solution and copper or nickel plating the activated surface.

2. A process as in claim 1 in which said polyolefin resin is ylene homopolymer.

A process as in claim 1 in which said polyolefin resin is lene homopolymer.

A process as in claim 1 in which said polyolefin resin is lene-propylene copolymer.

A process as in claim 1 in which said organic peroxide is a npound having a formula of $$R^1\text{-O-O-}R^2$$

rein $R^1$ is a monovalent organic group and $R^2$ is hydrogen monovalent organic group.

A process as in claim 1 in which said organic peroxide is a npound having a formula of

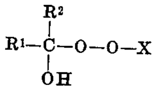

rein $R^1$ is a monovalent organic group, $R^2$ is hydrogen or a novalent organic group and X is hydrogen or

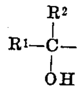

$R^1$ and $R^2$ being the same as above.
wherein

7. A process as in claim 1 in which said organic peroxide is a compound having a formula of $(R^3CO)_2O_2$ wherein $R^3CO$–is an acyl group.

8. A process as in claim 1 in which said organic peroxide is a compound having a formula of $$R^3COOOR^2$$

wherein $R^3$ CO is an acyl group and $R^2$ is hydrogen or a monovalent organic group.

9. A process as in claim 1 in which said organic peroxide solution has a concentration of 20–60 weight percent.

* * * * *